Figure 1:
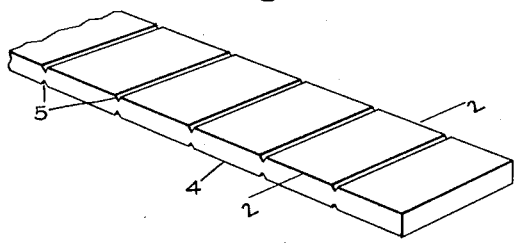

Oct. 26, 1937.  G. J. MEYERS, JR  2,097,298
METHOD OF MANUFACTURING ELECTRICAL CUT-OUTS
Filed Oct. 24, 1935

Inventor:
George J. Meyers, Jr.
by Harry E. Dunham
His Attorney.

Patented Oct. 26, 1937

2,097,298

UNITED STATES PATENT OFFICE 2,097,298

METHOD OF MANUFACTURING ELECTRICAL CUT-OUTS

George J. Meyers, Jr., Lynn, Mass., assignor to General Electric Company, a corporation of New York Application October 24, 1935, Serial No. 46,533

14 Claims. (Cl. 148—19.9)

The present invention relates to electrical cutouts and particularly to electrical cutouts comprising a conducting member coated on either one or both sides with a dielectric substance which, when subjected to a voltage above a predetermined high value, breaks down so as to provide a passage for the flow of current.

The invention is especially applicable to cutouts comprising copper coated with copper oxide, such cutouts being termed generally copper oxide film cutouts. It is to be understood, however, that in its broader aspects, the invention is not limited thereto necessarily.

Film cutouts, such as copper oxide film cutouts, are required to have a breakdown value which falls within a certain voltage range, the voltage range depending upon the particular application to which the cutouts are to be put. For example, in connection with most series incandescent street lighting systems, which is one application for film cutouts, film cutouts having voltage ranges of from 50 to 90 volts, from 100 to 200 volts and from 250 to 300 volts are generally utilized, the voltage range used varying with the size and characteristics of the lamps in the system. For other applications, the voltage ranges may be within different limits and higher or lower than those stated.

In connection with the manufacture of film cutouts of the type above referred to, difficulty has been experienced in quantity production methods in producing film cutouts having breakdown voltages falling uniformly within the desired voltage range, this being especially true in the case of film cutouts for lower voltage ranges such as 50 to 90 volts referred to above. For example, by one method with which I am familiar and which was in use prior to my present invention, it was often the case with low voltage film cutouts that out of a given batch, only about 30% would have a breakdown value within the desired range.

The object of the present invention is to provide an improved method for manufacturing electrical cutouts of the type referred to whereby there can be produced in quantities film cutouts having breakdown voltages which fall uniformly within the desired voltage range.

For a better understanding of my invention, together with other and further objects thereof, reference is had to the following description, taken in connection with the accompanying drawing, and its scope will be pointed out in the appended claims.

According to my invention, I take a conducting member, such as copper for example, and in the first instance I provide it with a coating, such as, in the case of copper, a copper oxide coating, of a thickness greater than that required to give a breakdown voltage within the desired range, and having provided this excess coating, I then remove the excess so that there is left a dielectric coating which will give a breakdown voltage falling within the desired range. In the case of copper oxide film cutouts, I provide the copper with an oxide film coating by means of heating the copper in an oven for a predetermined length of time at a suitable temperature, after which the excess copper oxide is removed by suitable means, such as by means of an acid, and the remaining oxide is annealed in order to improve its grain structure and stabilize its breakdown within the desired range.

By my improved method, I am enabled to produce copper oxide film cutouts in quantities wherein, out of a given batch, a number of the order of 97% will have breakdown voltages falling within the desired range.

As an illustration of my invention, I have elected to describe it specifically as applied to the manufacture of copper oxide film cutouts to have a voltage breakdown value of from 50 to 90 volts, this being a type of cutout used extensively in connection with series street lighting circuits. It is to be understoood, however, that this is only by way of illustration and that my invention is not limited necessarily in its application to copper oxide film cutouts of low voltage breakdown values.

In carrying out my invention, I take copper strips of suitable width and thickness and place them into an oven, the temperature of which is kept at a temperature sufficiently high to quickly oxidize the strips. I have found a temperature of 1055° C. to be preferable, although temperatures between 1010° C. and 1080° C. are suitable. The time that the strips are left in the oven at the above temperature is dependent upon the oven characteristics, and the thickness of the oxide desired. For cutouts intended to break down at voltages ranging from 50 to 90 volts, the metal is left in the oven about seven minutes whereby a coating is obtained which has a breakdown voltage of the order of 220 volts, a variation from this breakdown voltage of 40 volts more or less being permissible.

The strips are next removed from the oven and permitted to air cool to room temperature. Several tests may be made at this stage of the process to determine the thickness of the oxide produced on the surface of the strips.

In order to reduce the breakdown voltage of the oxide to a predetermined lower range, such as 50 to 90 volts, the strips are placed into an acid solution, which in the present example comprises a solution of 35 cc. of commercial $H_2SO_4$ to each 1000 cc. of water. The strips are left in this solution, which is preferably agitated during this step, until the oxide is reduced to a predetermined thickness. When copper is oxidized, as above described, a red oxide ($Cu_2O$) forms next to the metal and a black oxide (CuO) forms on top of the red oxide. During the acid treatment the black oxide is reduced until only a desired thickness of the original coating is left. For cutouts having a breakdown range between 50 and 90 volts, approximately 5% of the original coating of black oxide (CuO) is left.

The next step in the process consists in annealing the strip so as to increase the uniformity of the oxide structure and to stabilize it, thereby fixing the breakdown voltage within the desired range. In carrying out this step, the strips are preferably placed into a preheated container which is placed into the annealing oven and to which a small amount of air is admitted to blacken the surface of the remaining oxide. The temperature range at which the strips are annealed is between 600° F. and 1100° F. I have found preferable a temperature of 1000° F. (538° C.). It is necessary to have the strips in the annealing oven long enough for them to reach the temperature of the oven. The container is then removed from the annealing oven and its contents are dumped into a quenching bath kept at a temperature between 50° and 100° F., or in other words at ordinary room temperatures.

The strips are next removed from the quenching bath and dried. I prefer to use compressed air for this purpose, the temperature of which, after expansion at the nozzle, is a few degrees lower than room temperature.

Figure 2:
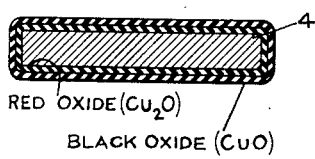
Figure 3:
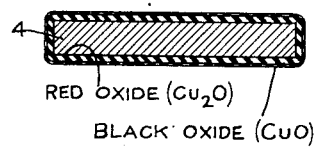

To illustrate my invention, I have shown in Fig. 1 of the accompanying drawing a strip 4 of metal, such as copper. The strip is partially severed at lines 5 into sections which are of proper dimensions to be placed into jackets and used. In Fig. 2 of the drawing I have illustrated an enlarged sectional view of the strip taken at line 2—2 of Fig. 1. It illustrates the oxide coating on the strip 4 after it is removed from the oxidizing oven. The oxide coating comprises an under layer of red, or cuprous, oxide ($Cu_2O$) and an outside layer of cupric or black oxide (CuO). At this stage of the process the two oxides are approximately of the same thickness. Fig. 3 is an enlarged view of the same section subsequent to the acid treatment. The acid has been permitted to reduce the thickness of the black oxide. The amount of the oxide that is reduced is dependent upon the voltage range that is desired.

In accordance with the provisions of the patent statutes, I have described the principle of operation of my invention, together with the particular method which I now consider to represent the best manner for carrying it out, but I desire to have it understood that the particular method disclosed is only illustrative, and that the invention may be carried out with such modifications as come within the scope of the appended claims.

What I claim as new and desire to secure by Letters Patent of the United States, is,—

1. The method of manufacturing dielectric film cutouts comprising a conducting member having a dielectric coating thereon which comprises producing on the member a dielectric film coating having a thickness to provide a breakdown voltage greater than that which is desired and then reducing the thickness of said dielectric until the desired breakdown voltage is obtained.

2. The method of manufacturing metal oxide coated film cutouts which comprises oxidizing the metal to form thereon a coating having a thickness to provide a voltage breakdown value greater than that which is desired, and then reducing the thickness of said oxide coating to a thickness to give the desired breakdown voltage value.

3. A process for manufacturing copper oxide cutouts which includes the step of oxidizing copper metal to form thereon a coating of red oxide $Cu_2O$ and black oxide CuO having a combined thickness to give a breakdown voltage greater than desired and subsequently reducing the thickness of the black oxide coating to obtain the thickness necessary for the desired breakdown voltage.

4. A process for manufacturing metal oxide film cutouts which comprises the production of a metal oxide having a thickness and breakdown voltage greater than desired and then reducing said oxide coating in an acid bath to a desired thickness and breakdown voltage.

5. A process for manufacturing a copper oxide film cutout which comprises oxidizing copper to produce a coating of red and black oxides having a combined thickness and breakdown voltage greater than desired, then reducing in an acid bath the thickness of the black oxide to obtain the desired thickness and breakdown voltage.

6. A process for manufacturing a metal oxide cutout comprising the oxidizing of the metal of the cutout to a thickness and breakdown voltage greater than desired, reducing said oxide to a desired thickness and breakdown voltage in an acid bath and subsequently annealing the coated metal to maintain the breakdown voltage constant at the desired value.

7. A process for manufacturing a metal oxide cutout comprising the oxidizing of the metal of the cutout to a thickness and breakdown voltage greater than desired, reducing said oxide to a desired thickness and breakdown voltage, annealing the coated metal, quenching it to room temperature and drying it with air slightly below room temperature.

8. A process for manufacturing copper oxide cutouts having a predetermined voltage breakdown characteristic which comprises heat treating metal copper at about 1055° C. to produce an oxide coating including layers of cuprous and cupric oxide of substantial thickness, treating said metal in an acid solution to reduce substantially all of the cupric oxide on said metal thereby reducing the thickness of said coating, annealing the metal at about 1000° F. while sufficient air is admitted to blacken the surfaces of said metal and thereafter quenching said metal to a temperature between 50° and 100° F.

9. A process for manufacturing copper oxide cutouts having a predetermined breakdown characteristic which comprises heat treating the metal from which the cutouts are made at about 1055° C. to form thereon an oxide coating of substantial thickness including cuprous and cupric oxide, reducing substantially all of the cupric oxide formed on said metal in an acid solution to reduce the thickness of said coating, annealing said metal at a temperature of about 1000° F., quenching said metal to room temperature and then drying the metal with air slightly below room temperature.

10. A process for manufacturing copper oxide cutouts which comprises heat treating metal copper at 1055° C. for about seven minutes to form thereon an oxide coating of substantial thickness including red and black oxide of copper, cooling said metal and washing in a solution of sulphuric acid until the black oxide formed during the first treatment is substantially removed whereby the thickness of said coating is reduced, annealing said metal at about 1000° F. for 11 to 16 minutes while admitting sufficient air to completely blacken the surface of said metal, quenching said metal and thereafter drying it with air having a temperature lower than said metal.

11. A process for manufacturing copper oxide cutouts which comprises heat treating the metal from which the cutouts are made at a temperature range between 1010° C. and 1080° C. to obtain an oxide coating thicker than required, reducing a predetermined portion of the oxide so formed on said metal in an acid solution so as to reduce said coating to a predetermined thickness, annealing said metal at a temperature range between 600 and 1100° F., quenching said metal to a room temperature between 50° and 100° F. and then drying the metal with air slightly below room temperature.

12. A process for manufacturing copper oxide cutouts having a predetermined breakdown voltage which comprises heat treating metal copper from which cutouts are to be made at between 1010° C. and 1080° C. to obtain an oxide coating having a thickness and breakdown voltage greater than desired, reducing the oxide formed on said metal in an acid solution until the required thickness and breakdown voltage is obtained, annealing said metal at a temperature between 600° and 1100° F., quenching said metal to a temperature between 50° and 100° F. and subsequently drying the metal with air having a temperature less than 150° F.

13. A process for manufacturing copper oxide cutouts which includes the step of oxidizing metal copper to form thereon a coating of oxide comprising a layer of red oxide ($Cu_2O$) and a layer of black oxide ($CuO$), thereafter reducing the thickness of said oxide coating by removing substantially all of said black oxide, thereafter annealing said metal to provide a desired grain structure of the remaining red oxide and thereafter quenching said metal to substantially prevent the formation of black oxide and to stabilize the breakdown resistance of said remaining oxide.

14. A process for manufacturing copper oxide cutouts having a predetermined voltage breakdown characteristic which comprises heat treating metal copper to form thereon a layer of oxide comprising cuprous oxide and cupric oxide and having a predetermined thickness, treating said oxidized copper to substantially remove said cupric oxide thereby reducing the thickness of said coating, thereafter annealing said copper to stabilize the grain structure of said remaining cuprous oxide and under conditions permitting a slight addition of black oxide and thereafter quenching said copper to prevent the further formation of oxide.

GEORGE J. MEYERS, Jr.